United States Patent
Manning et al.

(10) Patent No.: US 11,620,326 B2
(45) Date of Patent: *Apr. 4, 2023

(54) USER-SPECIFIC MEDIA PLAYLISTS

(71) Applicant: RCRDCLUB Corporation, New York, NY (US)

(72) Inventors: Damian Franken Manning, New York, NY (US); Samuel Evan Sandberg, Brooklyn, NY (US)

(73) Assignee: RCRDCLUB Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,067

(22) Filed: May 25, 2022

(65) Prior Publication Data
US 2022/0284053 A1 Sep. 8, 2022

Related U.S. Application Data

(63) Continuation of application No. 17/181,281, filed on Feb. 22, 2021, now Pat. No. 11,379,514, which is a continuation of application No. 16/451,171, filed on Jun. 25, 2019, now Pat. No. 10,929,457, which is a continuation of application No. 14/951,254, filed on Nov. 24, 2015, now Pat. No. 10,353,944.

(60) Provisional application No. 62/083,789, filed on Nov. 24, 2014, provisional application No. 62/083,840, filed on Nov. 24, 2014.

(51) Int. Cl.
*G06F 3/0482* (2013.01)
*G06F 16/438* (2019.01)
*G06F 16/951* (2019.01)
*G06F 3/04847* (2022.01)

(52) U.S. Cl.
CPC ........ *G06F 16/4387* (2019.01); *G06F 3/0482* (2013.01); *G06F 16/951* (2019.01); *G06F 3/04847* (2013.01)

(58) Field of Classification Search
CPC ............. G06F 17/30053; G06F 3/0482; G06F 3/04842
See application file for complete search history.

(56) References Cited

U.S. PATENT DOCUMENTS 5,317,507 A * 5/1994 Gallant ................. G06F 16/355
707/E17.08
5,325,298 A * 6/1994 Gallant ............... G06F 16/3332
707/999.005

(Continued)

OTHER PUBLICATIONS

Non Final Office Action dated Jun. 8, 2018 issued in U.S. Appl. No. 14/951,254.

(Continued)

*Primary Examiner* — Anil K Bhargava
(74) *Attorney, Agent, or Firm* — Butzel Long

(57) ABSTRACT

A media recommendation system may score media items according to user recommendations, popularity, and/or recency. The scores may be weighted to produce an overall score for each media item. Media items may be added to a pool for a specific user, from which media items are selected for playback. The contents of the pool may be modified based upon user feedback and other data. The pool may be modified dynamically and/or in real time as media items are consumed or rated by the user.

15 Claims, 5 Drawing Sheets

(56) References Cited

U.S. PATENT DOCUMENTS

| | | | |
|---|---|---|---|
| 7,227,072 B1* | 6/2007 | Weare | G10H 1/0008 |
| | | | 84/649 |
| 9,189,740 B1* | 11/2015 | Emigh | G06N 5/02 |
| 9,213,997 B2* | 12/2015 | Chatterjee | G06Q 50/01 |
| 9,235,853 B2* | 1/2016 | Weston | G06Q 30/0282 |
| 9,769,534 B2* | 9/2017 | Ferren | G06F 3/0482 |
| 9,904,949 B1* | 2/2018 | Tavernier | G06Q 30/0631 |
| 2003/0221541 A1 | 12/2003 | Platt | |
| 2008/0250039 A1 | 10/2008 | Franks | |
| 2009/0046101 A1* | 2/2009 | Askey | G06T 11/60 |
| | | | 345/470 |
| 2010/0017491 A1* | 1/2010 | Johns | H04N 1/00151 |
| | | | 709/206 |
| 2010/0312042 A1* | 12/2010 | Anderson | G06F 16/683 |
| | | | 600/28 |
| 2012/0233167 A1* | 9/2012 | Gates | G06F 16/639 |
| | | | 707/737 |
| 2012/0254363 A1* | 10/2012 | Martin | G06F 16/435 |
| | | | 709/219 |
| 2012/0296908 A1* | 11/2012 | Bach | G06F 16/683 |
| | | | 707/E17.089 |
| 2013/0046761 A1* | 2/2013 | Soderberg | G06F 16/48 |
| | | | 707/736 |
| 2013/0124536 A1* | 5/2013 | Miyahara | G06F 16/9535 |
| | | | 707/758 |
| 2013/0226957 A1* | 8/2013 | Ellis | G06F 16/634 |
| | | | 707/769 |
| 2014/0074269 A1* | 3/2014 | Weston | G06Q 30/0282 |
| | | | 700/94 |
| 2014/0114772 A1* | 4/2014 | Mok | G06F 16/44 |
| | | | 705/14.67 |
| 2014/0114978 A1* | 4/2014 | Chatterjee | G06Q 10/107 |
| | | | 707/739 |
| 2014/0114985 A1* | 4/2014 | Mok | G06Q 30/0271 |
| | | | 707/748 |
| 2014/0122502 A1* | 5/2014 | Kalmes | G06F 16/284 |
| | | | 707/748 |
| 2014/0229894 A1* | 8/2014 | Vinna | G06F 16/639 |
| | | | 715/810 |
| 2014/0372451 A1* | 12/2014 | Franks | G06F 16/3334 |
| | | | 707/765 |
| 2015/0220525 A1* | 8/2015 | Ross | G06F 16/435 |
| | | | 707/737 |
| 2015/0242750 A1 | 8/2015 | Anderson | |
| 2015/0293925 A1* | 10/2015 | Greenzeiger | G06F 16/635 |
| | | | 707/734 |
| 2016/0104074 A1* | 4/2016 | Shekhawat | G06F 16/35 |
| | | | 706/12 |
| 2016/0112761 A1* | 4/2016 | Venkataraman | H04N 21/252 |
| | | | 725/14 |
| 2016/0196270 A1* | 7/2016 | DiMaria | H04L 65/612 |
| | | | 707/749 |

OTHER PUBLICATIONS

Non Final Office Action dated Dec. 14, 2017 issued in U.S. Appl. No. 14/951,258.

Final Office Action dated Jun. 26, 2018 issued in U.S. Appl. No. 14/951,258.

Non Final Office Action dated Nov. 2, 2018 issued in U.S. Appl. No. 14/951,258.

Yoshii, Kazuyoshi, et al., Hybrid Collaborative and Content-based Music Recommendation Using Probabilistic Model with Latent User Preferences, 2006, University of Victoria, 6 pages (Year: 2006).

Final Office Action dated Dec. 31, 2018 issued in U.S. Appl. No. 14/951,254.

Notice of Allowance dated Mar. 22, 2019 issued in U.S. Appl. No. 14/951,258.

Notice of Allowance dated Apr. 10, 2019 issued in U.S. Appl. No. 14/951,254.

* cited by examiner

USER-SPECIFIC MEDIA PLAYLISTS

CROSS-REFERENCE TO RELATED APPLICATIONS

This application claims priority to, and the benefit of, of U.S. Provisional Application Ser. No. 62/083,789, filed Nov. 24, 2014 and U.S. Provisional Application Ser. No. 62/083,840, filed Nov. 24, 2014, the disclosure of each of which is incorporated by reference in its entirety.

BACKGROUND

A media recommendation service selects a user-specific subset of media items from the universe of available media items that the service determines may be enjoyed by the user. The selected media item can be provided to the user through a network to be rendered on a device of the user, such as a mobile device. A media item can be a song, video, animation, document or other media entity. When a user of the system begins a new session, the user can be associated with the subset of the recommended media items corresponding to the user.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
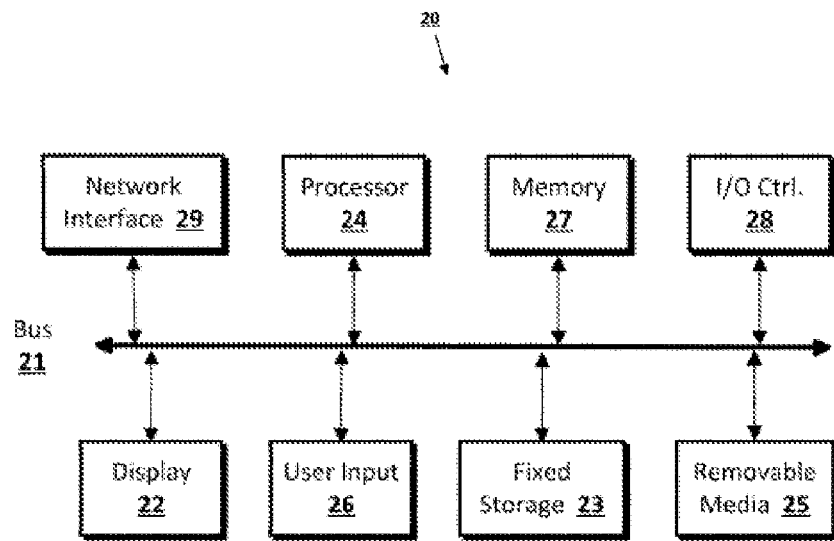
FIG. 1 shows an example of a computing device suitable for implementing embodiments of the disclosed subject matter.

According to embodiments of the disclosed subject matter, a media item recommendation system may score a media item according to user recommendations, popularity and/or recency. Such scores may be weighted and combined to produce an overall score for an item. The system may select a media item for inclusion on a playlist, i.e., a list of media items that will be played for or otherwise presented to a user, for further processing or for recommendation to a user based upon one or more of the item's scores.

As disclosed herein, a media recommendation service can select a subset of media items that a given user may enjoy, and organize them into a "pool." A pool can be an ordered collection of media items, potentially songs, videos, animations, documents or other media entities. More specifically, as used herein a "pool" refers to the media items from which a recommendation and media playback system will draw when presenting media items to a particular user. A pool may be distinguished from a conventional playlist in that the pool may be modified dynamically, based upon the user's interaction with items selected to be played from the pool, whereas a recommendation playlist typically is not modified once created by a recommendation system. However, in some embodiments, a media recommendation and playback system as disclosed herein may present the items selected from a pool in a playlist format, thereby allowing a user to review items that have been played and, in some embodiments, to see items that may be upcoming for playback from the pool. Such a playlist interface may be generated dynamically and, in some embodiments, may not present upcoming media items to the user, as the next item to be played may not be selected prior to being initially played for the user. Thus, as used herein, a "playlist" generated by a media recommendation system refers to the list of media items selected by the recommendation system from a pool of potential media items, in the order in which they are presented to the user.

When a user of the system begins a new session, the system can associate that user with a pool corresponding to the user. That is, a media recommendation system may include, or be able to provide access to, a large number of media items such as songs, videos, or the like. For each user that accesses the system, a pool of media items may be created, which includes a subset of the media items available in the system as a whole. For example, a pool may be represented by an ordered list of media items, all of which are selected from among the total media items available in the system. Further details regarding the construction, modification, and use of a pool are provided below. A playlist also may be generated for a user, with items in the playlist being selected from among the pool of media items created for the user. A playlist also may be represented as an ordered list of media items, with the order representing the order in which the items will be played for the user.

The system can choose an item to include in the pool based on several criteria. For example, the system can include "user-recommended" recommendations, "popular" recommendations, and "recent" recommendations in the pool. "User-recommended" items can be those that are recommended for the user based on the system's proprietary recommendation engine receiving actual user consumption habits as input.

For example, the system can receive as an input the identity of an item that the user has consumed (listened to, watched, read, etc.), an indication that the user has explicitly "liked" an item (e.g., the user has selected an onscreen button indicating the user's approval of the item), an indication of a high rating or positive review of the item by the user, etc. The system can identify similar items to the consumed or rated item. The similarity indicator of a candidate can have a magnitude indicating the degree of similarity with a consumed/rated item. In an implementation, the system can select candidate items for inclusion in the pool if the candidate items have a similarity indicator equal to or greater than a similarity threshold. In another implementation, the system can select the N most similar candidate items for inclusion in the pool, where N is an integer. The same and other criteria can be used to select candidate items not for immediate inclusion in the pool, but to be subject to further filtering based on other criteria.

"Popular" items can be the result of aggregating the actual consumption activity amongst the entire system's network of users and/or the user's specific network of friends, and/or the user's personal consumption history. Each item can be assigned a numeric value corresponding to a popularity score in each of these categories. The items may be arranged into an ordered list for each category, from most to least popular for that category. A specific weighting can be applied to the popularity score for each category ("category popularity"). For example, personal consumption history can be assigned a weight of 0.6, the user's network of friends can be weighted 0.25 and the actual consumption history can be weighted 0.15. These can be combined into an overall popularity score by summing the weighted popularity score for each item in each category. This can produce a list of items that can be ordered from overall most to least popular.

In some embodiments, an item may be selected for inclusion in a set of items for the pool or for further processing based on the position of the item in overall popularity or category popularity. For example, an ordered list of items from most to least popular can be divided into quintiles, the first (top) quintile containing the top fifth most popular items and the fifth (bottom) quintile containing the bottom fifth (least popular) items. The number of items selected from an ordered category or overall popularity list for the pool or for further processing can be adjusted. For example, the system can select 80% of items from the top quintile, 15% of items from the middle (second through fourth) quintiles and 5% of items from the bottom quintile. The items can be selected randomly, or in accordance with another criteria. For example, the system can select the 80 items with the highest user-recommended scores from the top quintile, the 15 items with the highest user-recommended scores from the middle quintiles and the 5 items with the highest user-recommended scores from the bottom quintile. Any combination of criteria can be applied in this way.

"Recent" items can be chosen based on the user's actual recent external consumption activity, meaning items consumed outside of the system within a given recent timeframe, such as the last hour, the last day, the last week, etc. The result can be an ordered list from most to least recently consumed items. An item's position on the ordered list can be altered in accordance with other criteria, such as the number of times the user has consumed the item. For example, an item that was consumed eight times over the past week by the user can be promoted ahead (up the list) over another item that the user has consumed once over the same period. Likewise, a frequently consumed item may be promoted above a more recently consumed item that was consumed a fewer number of times by the user.

A combination of these and potentially other recommendation results can be combined and filtering can be applied for higher quality results. For example, an ordered list generated by any of these techniques, either alone or in combination, can be further processed by taking into account the number of friends of the user (or others) who consumed the same media item and identifying items that have not been recently consumed in the system by the user. Such an item could be desirable to the user and can be selected by the system to recommend to the user.

In an embodiment, a profile vector may be created for each user of the system as described in further detail herein, which can be used to determine items that will be used as a seed for the user, recommended to a user, placed in a user's pool, or otherwise considered for presentation to the user. For example, a modified Collaborative Filtering approach may be used.

A Collaborative Filtering model constructs a user vector $\vec{v}_u$ and an item vector $\vec{v}_i$ for all users u and items i in the system, respectively. An "item" in this context may be an item such as a song, film, video, or the like, or a creator of the item, such as an artist. The closer the orientation a given user vector is to an item vector, the greater the likelihood that the user is interested in the item and, therefore, that the item should be considered for inclusion in the user's pool or presentation to the user. The distance between the two vectors can be determined as the dot product of the vectors.

The training process of the Collaborative Filtering model may be constructed to minimize $$\sum_i (M_{u,s} - \vec{v}_u \cdot \vec{v}_i)^2$$

With M being a matrix of users (rows) and media items (columns), and the dot product being close, but not equal, to the original matrix element $M_{u,i}$. An element of the matrix $M_{u,i}$ indicates the number of unique times a user u has consumed the media item i. A weight may be included in the value, for example, to give particular weight to a user's positive interaction with a media item. As a specific example, a "like" or other positive interaction may be considered as multiple unique consumptions. If the user u has not consumed the item i, then the matrix element $M_{u,i}$ value is 0. Because users typically consume a relatively small percentage of the total number of media items available, M typically is very sparse. A similar model may be trained using a matrix that includes users vs. artists (instead of individual media items). It is not possible to have a perfect match between the matrix element and the dot product. However, this is advantageous because it allows the matrix to be filled with non-zero weights (the dot product between the user and item vectors), to result in a less sparse matrix. This allows for the prediction of items that a user may be interested in, even if the user has never previously interacted with the particular item(s). More specifically, it allows for the creation of a ranked list of items for each user, as previously described. This also may be useful for testing purposes as disclosed herein.

In an embodiment, Collaborative Filtering may be used in the context of logistic regression to provide a probability that a given user consumes a given item i as $$P_{u,i} = \frac{e^{\vec{v}_u \cdot \vec{v}_i}}{e^{\vec{v}_u \cdot \vec{v}_i} + 1}$$

where $P_{u,i}$ is the probability of the user u consuming the item i. A bias term also may be added to the exponent terms to account for popularity bias of specific users and/or items. The model may be trained by alternately modifying the user and items vectors and minimizing error via a gradient descent, by calculating partial derivatives with variable step sizes. Such a calculation may allow for improved operation of an implementing computer system, since it can be parallelized for more efficient operation by mapping portions of the calculation to multiple processors.

Choosing an item for a playlist from the current pool can dictate how a user's session will begin and how the rest of the pool is ordered, based on similarity to the chosen item. The initial item to be played on the playlist can be based on an item recently consumed by the user, as this invokes a sense of familiarity and trust. On the other hand, if the system always started with a recently consumed item, it may make the experience feel redundant for the user. In that case, an item may be chosen based upon a "user-recommended" score. If there are no "user-recommended" items (for example in the case of a new user), the system may choose an item based upon a high popularity score. Once an item is chosen, item-to-item similarity scores can be calculated against the remaining items in the pool, which can then be rearranged in their order of similarity to the already-chosen item.

However, it is common for recommendation systems and techniques to suffer from the "cold start problem," i.e., that it may be difficult to provide a high-quality recommendation if it is not known what items a user has previously consumed. Typically, this problem is addressed by using various offline training techniques and a sufficiently-large data set on a diverse set of users. In contrast, embodiments disclosed herein may avoid the need for such training and/or large datasets by creating a real-time, "online" profile of the user. For example, the Collaborative Filtering vectors of all items consumed by a user may be added, as the user is consuming items, and the resultant vector may be normalized to a unit normalization. This provides an orientation of the user that allows the system to immediately provide at least a relatively basic level of personalization. The online profile also may be used to update users with offline profiles (i.e., users not concurrently accessing the media system). Additions to a profile may be made inversely proportional to the total number of times the user has consumed items, so as not to perturb established profiles. Users with no consumption history, i.e., users who are entirely new to the system or for whom consumption data is otherwise not available, may be recommended items based on popularity-based filtering and/or demographic-based filtering, as disclosed herein.

As previously described, embodiments disclosed herein may create a "pool" of media items or other items for potential consumption from a user from among the items available within a recommendation system. Typically the number of items in the pool is much smaller than the number of items available within the system as a whole. For example, a music recommendation system may include tens of thousands of individual songs, or more, whereas a pool for an individual user may include only 100 or fewer individual songs. The specific items in the pool also may change more dynamically than the items in the system as a whole.

In an embodiment, when an initial seed item is selected for a specific user, an initial pool of items that may follow the seed item may be created using Context-Based Filtering as disclosed herein. For example, a Context-Based Filtering system may represent items within the system, or within a user's pool, as vectors, as previously described. As a specific example, the word2vec algorithm, which conventionally is used to represent individual words or phrases as vectors, may be used to represent media items as vectors. Each media item, such as a song, may be considered a word, and media items played consecutively in a playlist as words following one another. Session windows may be defined based upon typical consumption patterns for media items. The session windows may be used as the context windows considered by the word2vec algorithm.

Relatively naïve implementations of Collaborative Filtering and Context-Based Filtering as disclosed herein may be inefficient for a number of reasons. For example, when searching for relevant items to place in a user's pool or a particular playlist for a user, the dot product may be computed for every item against an input vector x of interest. However, typically only the top matches to x will be of interest, so computing the dot product of x and every item available in a pool or, to an even greater degree, within the system as a whole, may be inefficient. Collaborative Filtering models also may be relatively accurate at detecting large-scale structures in datasets, but relatively poor at detecting strong associations in smaller datasets. To address these potential inefficiencies, nearest neighbor items may be used that hash item vectors into buckets. Partitioning items and subsequent hashing allows for a relatively fast calculation of nearest neighbor items, by increasing the lookup time using hashes that are based on pre-computed nearest neighbors.

As previously described, embodiments disclosed herein may use various techniques to select the initial seed items that are used to generate a pool of items for a particular user. It may be desirable for seed options that are used and/or presented to the user as options for initial seeds, to be both diverse and personalized to the user. With regard to media items, conventional genre labels often fail to capture the ways in which people actually consume media. For example, users often may listen to popular hip hop music alongside popular electronic music. Instead of relying upon existing genres and categories, it may be useful to generate categories and/or clusters of media items based upon actual user consumption. Thus, some embodiments may construct consumption-generated categories. Other categories that may be applied to media items include "trending" and "emerging". Alternatively or in addition, media items may be categorized as recently consumed and/or recently liked, where a user or users has/have consumed or "liked" a media item within a threshold amount of time.

As previously described, each media item and/or artist may be represented by a distinct vector within a recommendation system. The closer the vector representation of one item or artist is to another, the more similar the artists or items are. As described in further detail below, the number of times a particular media item is consumed typically is power-law distributed, with a small percentage of artists dominating the number of consumptions. Thus, a collection of top artists' artist-space vectors may be aggregated, and a two-dimensional reduction on the artist vectors may be performed, such as by t-distributed Stochastic Neighbor Embedding (t-SNE). Such a technique may be particularly effective in generating well-separated clusters. The result is a two-dimensional vector for each artist. Clusters of artist vectors then may be created, such as using Dirichlet process mixture models. More generally, any nonparametric process may be used. Typically the process will not require a predetermined number of clusters, and/or may determine an optimal number of clusters automatically. In other embodiments, any clustering algorithm may be used.

After artist clusters are created, a Gaussian Mixture Model may be used to create discrete categories for each artist, which are based solely on actual consumption by users. In addition, a mixture model may generate the probability of any artist belonging to any of the generated categories, including those that are not the closest match. The process may allow for partial membership in clusters, and consumption-driven categories that do not depend upon rigid, predefined genres. This is because a Gaussian Mixture Model presumes that artist vectors are generated from a mixture of Gaussian distributions with various means and variances. The closer an artist vector is to the mean of a particular category's Gaussian, the better a match it is for that category. Similarly, an artist vector is penalized for being farther from the mean, for a smaller variance of a particular Gaussian. The probability for a particular artist to belong to a particular cluster i is $$w_i = e^{-\frac{(\vec{x}-\vec{u})^2}{2\sigma_i^2}}$$

where $w_i$ is the weight for cluster i, x is the location of the tSNE projected artist vector under consideration, $u_i$ is the center or mean vector of cluster i, and $\sigma_i$ is the standard deviation of cluster i.

For each category, the artists may be stored by their respective match to the category, including artists on the periphery, i.e., that are not near the center of the category. A random number may be used to draw an appropriate assignment of artists or media items to a particular pool, which may be weighted proportionally to the weight of the artist in the category.

In some embodiments, a category that includes all artists that are not included on a "top artists" list may be added artificially. This "not popular" category may be used to generate suggestions for users that desire less-popular media items. The "top artists" may be determined based upon the power-law distribution previously described and as disclosed in further detail below. For example, all artists past a critical peak as shown and described may be considered "not popular" artists.

The weight of each category may be stored for each user in a recommendation system, for example in a N-dimensional array of weights ($w_1$, $w_2$, . . . , $w_N$) representing a sampling of all categories by the user including the "not popular" category. Each user category preferences, as indicated by the user and/or as determined automatically by the system, may be stored in a Dirichlet distribution. The Dirichlet distribution is the conjugate prior of the multinomial distribution. Weights may be initialized with the weights generated by all other users as previously disclosed, and the overall number of members with the typical standard deviation for a user as determined across all users in the system. This also may be used as a Bayseian prior. As a user consumes media items, the weighting of the user's Dirichlet distribution may be updated to reflect the user's preference (as determined by plays, likes, dislikes, and skips). This may provide seemingly-seamless category personalization to each user.

In an embodiment, multiple seeds may be presented as options for the user to begin consuming media items. For example, in a music recommendation and playback system, multiple initial songs may be presented to the user. When the user selects a particular song, a playlist may be generated and/or accessed, where the selected song is the seed for the pool from which items on the playlist are drawn. The pool may then be updated and/or items added to or removed from the playlist based upon the user's consumption of items in the playlist, as previously disclosed. For example, the following types of seed media items and/or artists may be presented as seed options to the user:

Trending—the top-performing media items or artists within a recent time interval. For example, the media items or artists that have been played by all users or a group of users within the system over the past hour, day, week, or the like may be included.

Emerging—relatively less well-known items/artists with a relatively high consumption count. The consumption count may be determined over a particular time interval. For example, less popular media items that have been consumed at a higher rate than other less popular media items within the last week may be included.

Recent—items/artists that have been consumed by the user from a source external to the recommendation system.

Liked—items/artists that have been explicitly "liked" or otherwise indicated for approval by the user, either within the recommendation system or an associated system, such as an external social network that the system can access.

Selected—items/artists specifically curated by staff members of a media recommendation system, advisors, or the like.

Active—media items that similar or socially-connected users are consuming at the moment. For example, if a user has a social network connection to another user within the recommendation system or within an external social network, and the connected user is listening to a particular song, the song or the associated artist may be presented as an "active" seed. In some embodiments, an indication of the connected user or users from which the seed has been drawn may be provided to the user.

Recommended—items/artists that are close or closest to the user, based upon the profile vectors previously described herein.

For each type of seed, a specific seed item may be selected to be presented to each user using any suitable technique. For example, within a seed category, the particular item presented to the user may be the item that is closest to the user's profile vector. As another example, a particular item may be selected randomly from within all items in the seed category. Alternatively or in addition, the seed type may be presented to the user for selection. For example, an interface may show the user the specific media item and/or artist, as well as the seed category the item/artist represents, such as "trending," "emerging," or the like.

When a user selects a particular seed, a pool may be generated from the seed as previously described. The pool then may be updated based upon a user's interaction to media items played from a playlist generated from items selected from the pool, as previously disclosed.

Figure 3A:
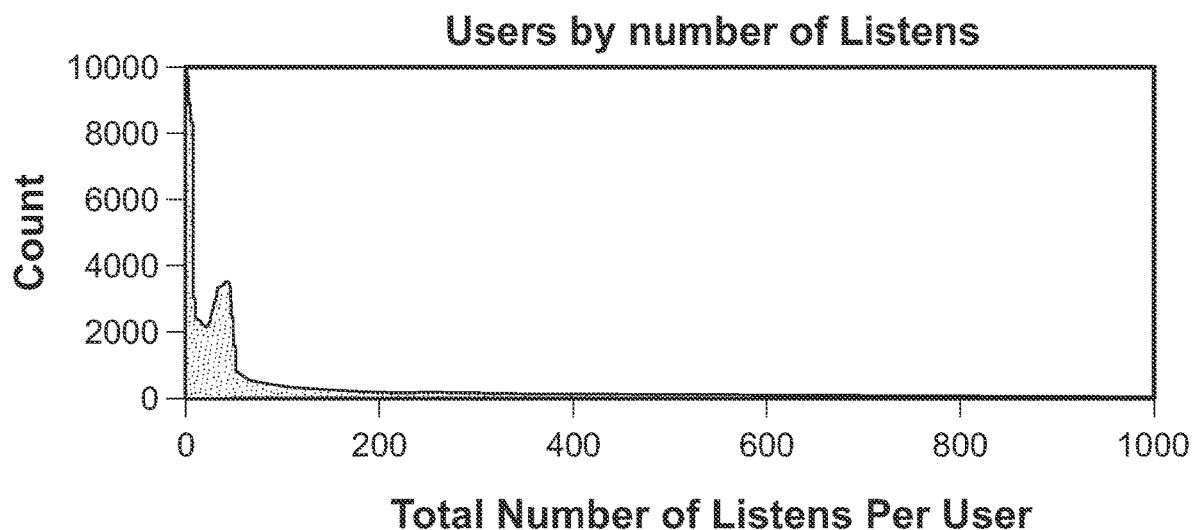
FIGS. 3A-3B illustrate the number of total times a user has listened to a song in an example music recommendation system according to an embodiment.
Figure 3B:
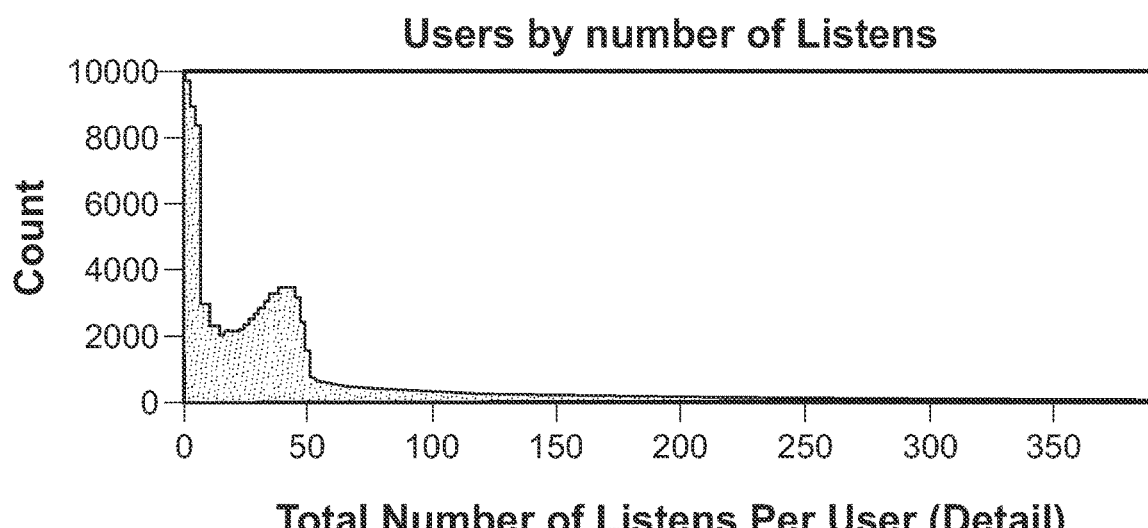

As previously disclosed, in many cases the majority of users in a media recommendation system may have a relatively low consumption compared to the most active users within the system. For example, FIGS. 3A-3B illustrate the number of total times a user has listened to a song in an example music recommendation system as disclosed herein. As shown the number of "listens" are power law distributed, with a peak at a critical number of songs.

In an embodiment, users with a relatively high consumption level, e.g., before the peak in FIGS. 3A-3B, may be treated differently than those with a relatively low consumption level. For example, users with few listens, i.e., those who have consumed relatively fewer media items within a recommendation system, an online profile vector may be created for the user as previously described. Although the user's vector may be updated dynamically as previously described, the Collaborative Filtering process may not be applied to media items suggested to or added to a pool or playlist of the user. Instead, demographic and/or popularity filtering as disclosed herein may be used. This may prevent the user from receiving a large number of recommendations of media items that the user may find unfamiliar, unexpected, or undesirable.

Other filtering techniques may be used in addition to or instead of the filtering techniques previously disclosed. For example, media items placed in a pool or playlist for a user may be selected or filtered based upon the time of day. For example, the time at which a user consumes, skips, likes, or dislikes a particular media item may be recorded and, after the user has interacted with a sufficient number of media items, statistically significant preferences for the user based upon the time of day may be determined. For example, a classifier may be used to determine favorable categories for a user based upon the time of day. The classifier may be configured to apply the same categorization techniques previously described, but using the time of day as an attribute of previously-consumed media items. As another example, the Bayesian updating approach previously disclosed may be used to determine category weights based upon the time of day. Similarly, a user's demographics may be used to determine statistically favorable categories in a similar fashion. As a specific example, gender, age, geographic location, or the like may be used to identify media items and category weights that may be appropriate to a particular demographic.

Figure 4:
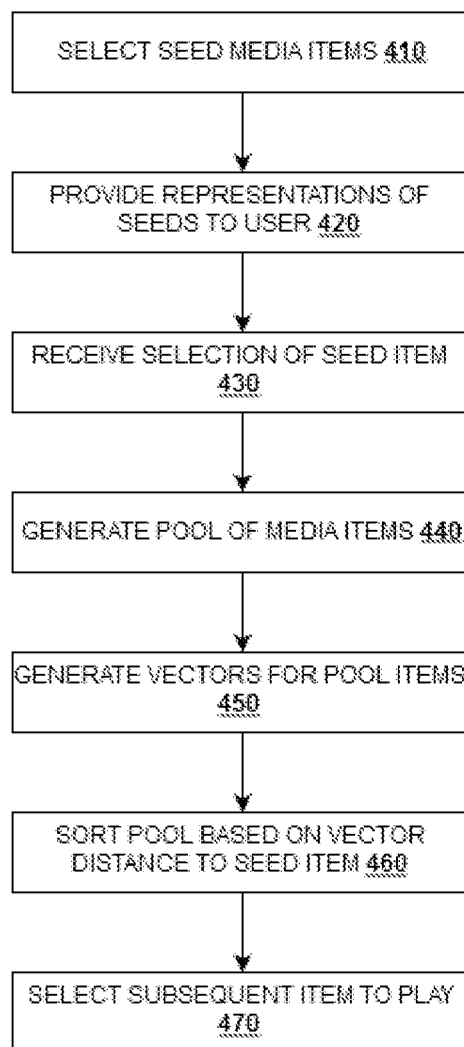
FIG. 4 shows an example process that may be used to generate a user-specific pool according to an embodiment.

FIG. 4 shows an example process that may be used to generate a user-specific pool according to embodiments disclosed herein. At 410, one or more seed media items may be selected, using any of the techniques previously disclosed herein. For example, in a music recommendation system, one or more seed songs may be selected. Multiple seeds may be selected and presented to the user as previously described. At 420, representations of the selected seeds may be provided to a user, such as via a selection interface. As an example, song or album covers for the specific seed songs selected may be presented in an interface in which the user may select one of the seed songs to begin playback of media items within the music recommendation system. At 430, the user's selection is received. A pool of media items specific to the user may be generated at 440. For example, at 450, songs having vectors within a threshold distance of the selected seed song may be added to the pool, as previously described. The pool may be sorted, for example, based on the vector distance between each item in the pool and the seed song. After the seed song is played completely or is skipped or "disliked" by the user, a subsequent item to play may be selected from the pool for playback by the system as previously described.

As a user consumes items from a pool, the pool may be modified in a number of ways. For example, the pool may be sorted based upon the probability that each item should be provided to the user as the next item in a playlist, such as based on most recent consumption of the item as defined by the item's Collaborative Filtering profile. As another example, every time the user completely consumes and/or "likes" an item, similar items may be added to the pool. "Similar" items in this context may be those that are closest to the liked item based upon the items' Collaborative Filtering profiles, the item's nearest-neighbor matches in t-SNE space as described herein, or based upon any other relative ranking of item similarity within the system. Similarly, if a user "dislikes" an item, such as via a "thumbs down" or similar interface, the most similar items may be removed from the pool, and replaced with other items selected using any technique disclosed herein. If a user "skips" an item, i.e., moves on to the next item in the existing playlist but without actively "disliking" the item, the skipped item may be removed from the pool. Alternatively or in addition, items similar to the skipped item may be removed from the pool. The number of items removed from the pool may be proportional to the number of skips in recent history. Thus, if a user skips several items in a row, a relatively larger percentage of items may be removed from the pool, as this may indicate that the user's current preferences have changed, or similar. When items from a pool are placed into the user's playlist, similar items may be placed together so as to provide for smooth transitions between items. For example, in a music recommendation system, acoustically-similar songs may be placed adjacent within the playlist, presuming that they are of comparable likelihood to be presented at a particular point in the playlist, so as to allow for relatively smooth acoustic transitions between items in the playlist.

More generally, a media item recommendation system as disclosed herein can monitor a user's behavior and interaction with items in a pool, including receiving explicit feedback from the user. The information obtained from such monitoring can be used by the system to modify and reorder the items available in a media item pool that corresponds to the user.

In particular, the system can utilize input based on the user's activities to schedule which item to cue up next, such as which media item to play next in a sequence of items played for the user. Types of user responses can be categorized generally as "positive feedback" or "negative feedback." Positive feedback can indicate that the user likely enjoys the item being played, and the system may determine that additional items with similar qualities should be prioritized and added to the pool as the session continues. For example, similar media items as previously described can be added to the user's pool, or a pool associated with a particular seed, as previously described. Negative feedback can indicate that the user doesn't enjoy the item being played or otherwise does not want to consume or finish consuming the media item, and the system may remove similar items from the pool.

Specific examples of positive feedback may include: "play", which can indicate that the user has chosen to play a media item and can be received around the time a user commences playing the item or around the time a media recommendation system begins playing the item as a "next" item in cases where the system is configured to play a sequence of items from the user's pool; and "play full" or a "playthrough", when a user plays through the entire duration of an item without explicitly liking or skipping the item; "like", when a user explicitly likes an item. Examples of negative feedback include "dislike" when a user explicitly dislikes an item, and "skip", when a user skips a currently-playing media item to move to the next item. In some embodiments, other types of user actions and/or feedback may be included as positive or negative feedback. As a specific example, a user may choose to exit a music recommendation service during playback of a song; this may be considered negative feedback or not considered as feedback. As another example, the user may request album purchase availability or other information during playback of a song; this may be considered positive feedback or not considered as feedback.

Each time the user submits positive feedback, the system may or may not attempt to add one or more new items to the user's pool. The number of new items to add may depend on the type of feedback. For example, one item may be added for a "play" event, two items may be added for a "play full" event, and six items may be added for a "like" event. The system can select an item to add to the pool based on the current item being played/liked/etc., and other recent positive feedback. The feedback can be considered within a specific threshold of recent activity. For example, the system can consider the ten most recently received items of feedback, such as the most recently consumed, liked, rated or reviewed items, which may or not be limited to the same user session. The system may assign a "smooth transition score multiplier" to each of these items of feedback. For example, such a multiplier may be based upon a base value (for example 0.85) raised to the power of the relative position of the previously "liked" item. For example, the base can be raised to the power 0 for the current item, 1 for the previous item, two for the item before that, and so on. The score for a given item can be multiplied by the smooth transition score multiplier.

After an item is added to the user's pool, the order of items in the pool can be readjusted in order of item similarity to the most recently played item, for smoothness. When searching for similar items to recommend, the system can have advance knowledge of which items to exclude. For example, the system can exclude from adding items that already exist in the user's pool, that the user has consumed within a recent timeframe, that are created or performed by artists that the user has recently consumed, e.g., within a recent consumption time or item threshold. For example, items that the user has consumed within the last twenty minutes, items that the user has consumed within the ten most recently consumed items, etc.

For example, a user engaged in an audio session may listen to and "like" (provide a positive indication about the song by, say, selecting an icon on a display) songs "A", "B", and "C" consecutively in that session. When responding to the "like" positive feedback for song "C", the system may add 6 songs to the user's pool in response to the explicit "like" action. The system can assign to current song "C" a "smooth transition score multiplier" of $0.8^0$, or 1.0. Song "B" can receive a multiplier of $0.8^1$, or 0.85. Song "C" can receive a multiplier of $0.8^2$, or ~0.72. The system can find which songs are the most similar to song "C" and can multiply all of their similarity scores by 1.0. The system can find which songs are the most similar to song "B" and can multiply their similarities scores by 0.85. Finally, the system can find which songs are the most similar to song "A" and can multiply their similarity scores by 0.72. The sums of all of the song similarity scores can be aggregated and the results can be sorted in descending order. The 6 top-scoring songs can be selected and added to the user's pool. The result of this "positive feedback" is that the pool now has 6 more songs that are likely mostly similar to C, but also a bit similar to B, and a bit less similar to A.

"Negative feedback" can occur in any of several forms of "skip", which can include a "soft skip", when a user skips an item, but only after a good portion of the item has already played, and a "hard skip", when a user skips an item before that "soft skip" threshold. A skip can be determined to be soft or hard based on a soft skip threshold, which can correspond to a measure of how much of the song was listened to before a skip indication was received from a user. The threshold can be in seconds, percentage of the song, bits or any other suitable measure.

When a "soft skip" occurs, the system can treat it as though the user just didn't want to consume any more of that item and apply no negative feedback. A "Hard skip" can be further analyzed into tiers based on recent skipping activity. After a hard skip occurs, the system can search for other recent negative feedback within a specific threshold of recent activity. For example, the system can examine 10 recent items from within the same session. Based on the number of recent skips within that threshold, a "skip tier" can be designated. For example, 1 recent skip could imply "tier 0", 2 recent skips could imply "tier 1", 3 recent skips could imply "tier 2", and 4 or more recent skips could imply "tier 3".

The system may interpret "tier 0" as meaning that a user simply didn't like that specific item, or maybe its artist, so the system may take no proactive action.

With higher tiers, the system may remove items from the user's pool, the number of which depends specifically on the tier assigned and the similarity of the items currently in the pool. Existing items in the pool can be compared for similarity to the item currently being skipped. The mean and standard deviation of these similarity scores can be calculated, and then a threshold can determined based on the tier. For example, for "tier 1", the threshold might be 1.645 standard deviations to the right of the mean, resulting in approximately 5% results for normally distributed scores. For tier 2, the threshold may be 1.282 standard deviations to the right of the mean, resulting in approximately 10% results for normally distributed scores. For tier 3, the threshold might be 0.674 standard deviations to the right of the mean, resulting in approximately 25% results for normally distributed scores. Items that have similarity scores that fall above that calculated threshold, meaning the ones most similar to the item that is currently being skipped, can be removed from the pool, and new recommendations can made to fill in the number of removed items.

The overall impact of the positive and negative dynamic feedback during a playlisting session can be that items similar to those that the user either implicitly or explicitly likes can be recommended more often, and items similar to those that the user explicitly skips can be recommended less often. Ongoing modification and reordering of the user's pool can create a compelling overall listening experience.

Figure 5:
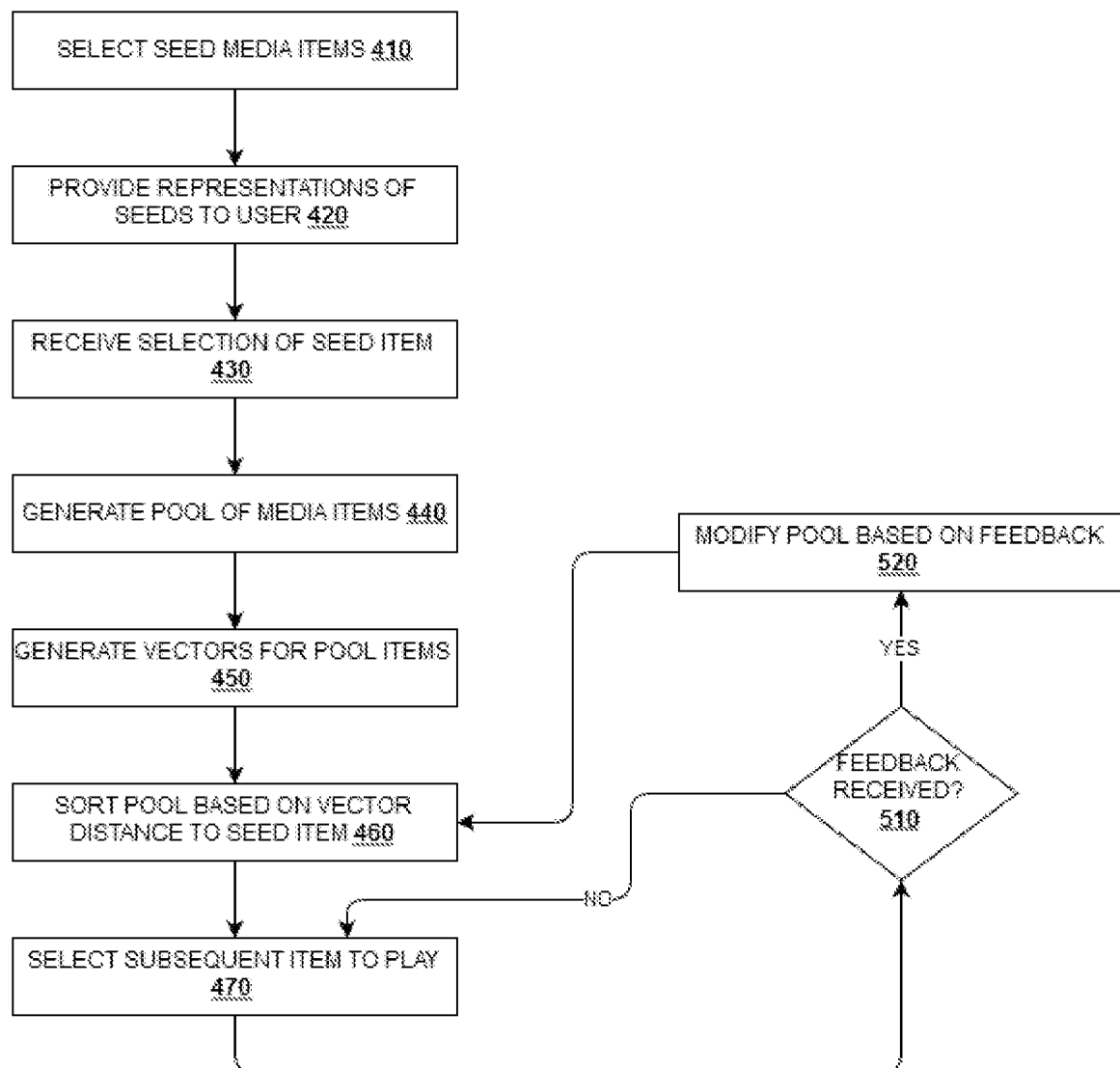
FIG. 5 shows an example process in which a pool is modified dynamically based on user feedback of media items in the pool according to an embodiment.

FIG. 5 shows an example process according to embodiments disclosed herein in which a pool is modified dynamically based on user feedback related to media items in the pool. Steps 410-470 may be performed as previously described with respect to FIG. 4. At 510, the system may receive feedback related to a media item in the pool that has been consumed, partially consumed, or otherwise interacted with by the user. For example, a user may play a song through, provide positive feedback such as a "like", or provide negative feedback such as a "skip" or "dislike." As previously described, upon receiving feedback the system may modify the contents of the pool associated with the user at 520. For example, if a user plays a song through completely without skipping or providing other negative feedback, similar songs may be added to the pool. The similarity may be based upon a vector distance between the played-through song and the added song, or upon any other comparison as disclosed herein. The pool may be re-sorted at 460 after addition of the new media item, or playback may continue at 470 without re-sorting the pool.

In an embodiment, a dynamic state learner may be used to estimate an expected state of an individual user at a particular time. This may allow for more accurate recommendation of media items to the user, by identifying media items that are "close to" the expected state. For example, using a vector representation of a media item as previously disclosed, media items having vectors that are close to the expected state may be recommended.

An expected state of a user at time t can be denoted as $E_t$. The state then may be updated according to $$E_t = \gamma E_{t-1} + \Delta_t$$

$\Delta_t = s_t$ for a "listen" or other indication that a user has consumed the media item completely, $\Delta_t = \beta(\tau) s_t$ for a media item that is skipped at a time $\tau$ seconds into playback, and $\Delta_t = \alpha s_t$ for a "like" or similar explicit positive feedback, where $s_t$ is the state of the media item consumed (or partially consumed) by the user; $\beta(\tau)$ is a weight assigned to a media item that has been consumed for $\tau$ seconds; and a is the weight assigned to a "like". In general, $\beta(\tau)$ may be negative for relatively short times, and zero for longer times. The weights may be determined by training a machine learning system or similar artificial learning system based on historical data. The model may be constructed to have a weak assumption that each state is a slightly altered version of an older state by use of the $\gamma$ factor, in addition to the correction term $\Delta_t$. The model may be separately trained to apply at different points, or separate models may be trained for different points in operation of a recommendation system. For example, separate training or separate models may be used during a playback session; when a user first selects a media item; and when a user moves between media items, such as during a transition following consumption of a media item or when a user skips a media item.

Figure 6:
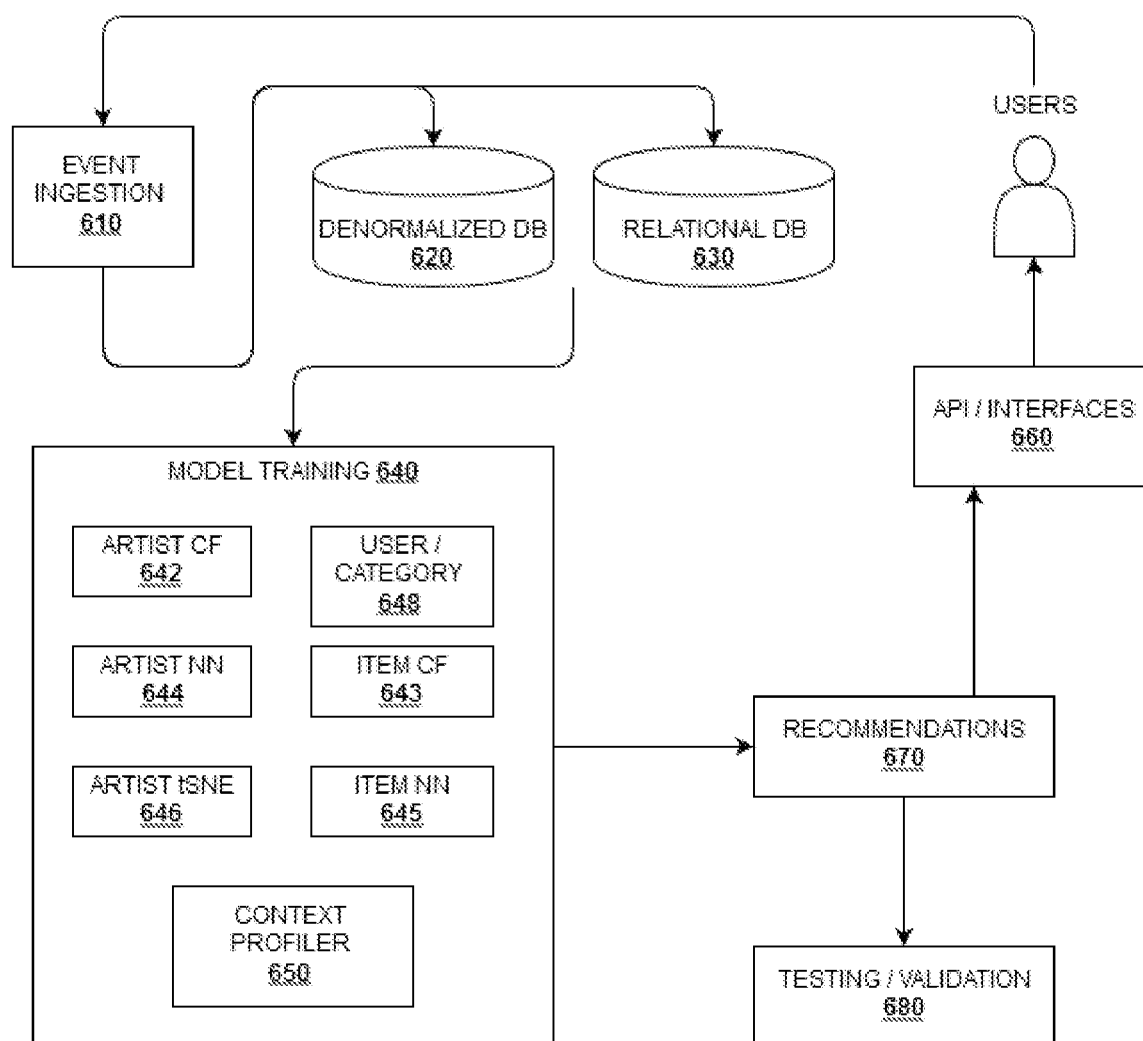
FIG. 6 shows an example of a computerized recommendation system according to an embodiment.

FIG. 6 shows an example of a computerized recommendation system as disclosed herein. The system may be implemented on one or more computer systems, including servers, groups of servers, "cloud" architecture, or the like, examples of which are provided with respect to FIGS. 1-2. Each component described may be implemented on a separate computer or computer system, or multiple components may be implemented on a common computer or computer system. The system may provide an event ingestion interface 610 to receive, for example, user feedback related to media items such as "likes", "listens", and so on. The interface 610 may receive, sanitize, and denormalize such data for use in the system. Event data and other data used by the system may be stored in one or more denormalized and/or relational databases 620, 630.

Data stored by the system may be used for model training, such as in a computer learning system 640. For example, a profiler as disclosed herein may be implemented by the model training system 640. Such a profiler may include the artist and/or item Collaborative Filtering models 642, 643, respectively, as disclosed herein; artist and/or item nearest-neighbor models 644, 645, respectively, as disclosed herein; artist tSNE categorization 646 as disclosed herein; and/or user and/or category 648 sampling as disclosed herein. A context profiler system 650 may generate profile vectors as disclosed herein, such as by using word2vec, RNN, acoustic models, and/or other models, including those described herein.

As disclosed herein, the models trained by the model training system 640 may be used to generate recommendations 670 for one or more users, which can be presented to the users via APIs and/or other interfaces 660. For example, in a music recommendation system, recommendations of songs the user may enjoy may be provided via a web interface, a mobile interface, or any other suitable user interface 660. Access to recommendations also may be provided by an API, thereby allowing other computer systems separate from the recommendation system to make use of the generated recommendations 670. The recommendations 670 also may undergo testing and modification. For example, a test set of data may include 90% of consumption and feedback data for a particular user, set of media items, or the like, upon which the models are trained at 640. The remaining 10% may be used to compare known consumption and feedback to the predictive results of the model. Other testing techniques may be used.

The use of user-specific pools and the dynamic adjustment of each user's pool based upon feedback received from the user may provide benefits over conventional media recommendation systems, which typically operate by following acoustic- or genre-specific relationships among all media items available to the system. For example, music recommendation and playback systems often maintain a tree of acoustic similarities between individual songs and artists. When a user selects a particular song, the system typically will select following songs that are acoustically and generically similar, without regard for any other classification. Thus, embodiments disclosed herein may provide more precisely tailored media playback experiences for users, while still providing access to media items that the user may not consider similar, but would still enjoy consuming.

Embodiments disclosed herein also may provide benefit to, and improvement upon, the underlying computer architecture upon which media recommendation and playback systems as disclosed herein are implemented. For example, as previously described, systems and techniques disclosed herein may allow for more efficient and accurate processing of media files, such as more accurate identification of "similar" media items, more accurate recommendations provided to users, and reduced processing speeds and resource requirements to process the same number of media items. That is, systems according to embodiments disclosed herein may operate more efficiently and require fewer computing resources than conventional recommendation and playback systems. Furthermore, embodiments disclosed herein may provide more precise recommendations to users than would be achievable using conventional or known techniques. For example, techniques disclosed herein may be more accurate at predicting media items that a user may wish to consume, based only on their previous consumption habits and history, than would otherwise be possible. In addition, embodiments disclosed herein may be particularly suited and configured to operate in a computer-networked environment, such as where connections to other systems such as social media systems may provide additional sources of data that can be used by systems as disclosed herein to more accurately predict a user's preferences. Such predictions and prediction accuracy would generally not be available outside of the computer networked systems disclosed herein.

Although embodiments disclosed herein may be described by way of examples relating to music categorization and consumption, it will be apparent to one of skill in the art that the same techniques and systems may be used for, or extended to, other types of media such as films, short videos, or the like. For example, films often have one or more associated "artists" such as studios, directors, producers, and the like. Thus, in an embodiment directed solely to film recommendation, such artists may be used in the same manner as described in examples provided herein instead of the traditional music "artist."

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components.

Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
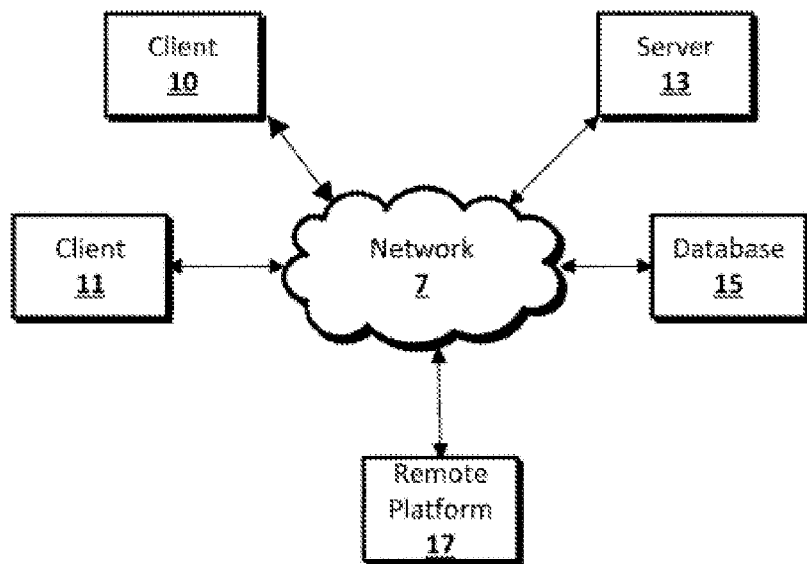
FIG. 2 shows a network configuration according to an embodiment of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
calculating, at a processor, distances between vector representations of media items in a first pool and a vector representation of a seed media item, wherein the seed media item is of a type selected from the group consisting of: trending, emerging, recent, liked, selected, active, and recommended;

sorting, at the processor, the first pool based upon the calculated distances;

receiving, at the processor, a feedback signal about a first media item that is selected to be played based on the sorting of the first pool; and modifying, at the processor and based upon the feedback signal, contents of the first pool to generate a second pool, wherein the second pool includes a second media item that is not included in the first pool, and wherein the second media item is selected based upon a distance between a vector representation of the second media item and a vector representation of the first media item.

2. The method of claim 1, wherein the first pool comprises a subset of a plurality of media items available within a computerized media recommendation system.

3. The method of claim 1, further comprising:
generating, at the processor, the vector representations of the media items in the first pool.

4. The method of claim 1, further comprising:
generating, at the processor, the first pool.

5. The method of claim 1, wherein the generating the first pool comprises generating the first pool based on the seed media item.

6. The method of claim 1, further comprising:
receiving, at the processor, a selection of the seed media item,
wherein the receiving the selection comprises receiving the selection from among a plurality of seed media items.

7. The method of claim 6, wherein the plurality of seed media items comprises a first type of seed media items and a second type of seed media items, each of the first type of seed media items and the second media items is defined by at least one of a count, over a specific duration of time, of a consumption of a media item, or a count, over the specific duration of time, of receipts of positive feedback about the media item, the first type of seed media items being different from the second type of seed media items.

8. The method of claim 7, wherein the media item in the count of the consumption of the media item comprises at least one of a media item determined to be less well-known than an average well-known media item, a media item consumed by a user from a source external to a computerized media recommendation system, or a media item being consumed by users connected to the user by a social media network.

9. The method of claim 7, wherein the media item in the count of the receipts of the positive feedback comprises at least one of a media item associated with an affirmative action to express the positive feedback or a media item selected by an individual associated with an entity that controls a computerized media recommendation system.

10. The method of claim 1, further comprising:
selecting, at the processor, the seed media item.

11. The method of claim 10, wherein the seed media item is available for playback to a user within a computerized media recommendation system.

12. The method of claim 10, wherein the selecting comprises selecting, based on a profile vector of a user, the seed media item.

13. The method of claim 12, wherein the selecting the seed media item based on the profile vector comprises a normalized sum of vector representations of media items previously consumed by the user.

14. The method of claim 13, wherein the profile vector is updated in real time.

15. The method of claim 1, wherein the second pool excludes a third media item, the third media item being in the first pool.

* * * * *